Dec. 15, 1936.　　E. J. W. RAGSDALE　　2,064,179
SELECTOR CONTROL SWITCH
Filed Aug. 20, 1934
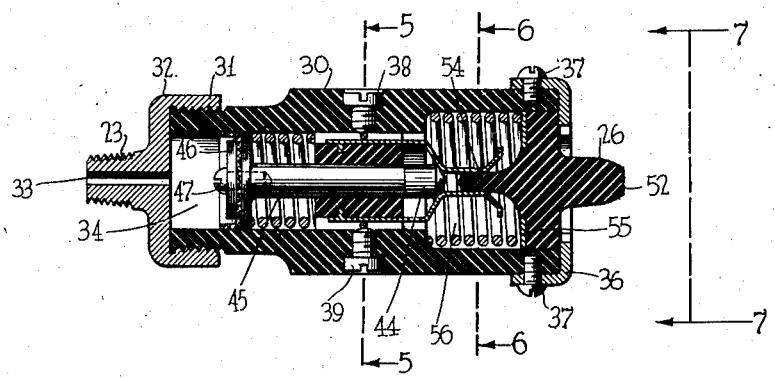
INVENTOR.
Earl J.W. Ragsdale.
BY John P. Tarbox
ATTORNEY.

Patented Dec. 15, 1936

2,064,179

UNITED STATES PATENT OFFICE 2,064,179

SELECTOR CONTROL SWITCH

Earl J. W. Ragsdale, Norristown, Pa., assignor to Edward G. Budd Manufacturing Company, Philadelphia, Pa., a corporation of Pennsylvania Application August 20, 1934, Serial No. 740,594

5 Claims. (Cl. 200—82)

This invention relates to electric control devices and more particularly to a fluid operated switch arranged for selective actuation by and/or independent of a fluid pressure medium.

In electric welding operations where portable welding tools and guns are utilized, it is desirable to frequently test the welding equipment for purposes of ascertaining whether the electric control is operating, whether the fluid pressure control is operating and where both are cooperatively arranged, whether both are operating and also to have a means whereby any one or all of such operations may be checked independently or collectively.

I have attained the foregoing desired objects, among others not specifically enumerated, by constructing a fluid operated switch having a variable selector control.

My invention will be better understood from the following description and appended claims when considered in connection with the accompanying drawing wherein like ordinates represent corresponding parts on the various figures:

Figure 1 shows the switch of my invention applied to a welding gun.

Figure 2 shows an axial cross section through the switch in operated position.

Figure 3 shows a similar view to Figure 2, wherein the selector control has been operated.

Figure 4 has a similar partial cross section showing the switch in selectively inactive position.

Figure 5 shows a section on line 5—5 of Figure 2.

Figure 6 shows a transverse axial cross section on line 6—6 of Figure 2.

Figure 7 shows an end view on line 7—7 of Figure 2.

Considering the drawing in more detail, I have shown one embodiment of my invention applied in its at present most useful field of use namely applied to the portable welding gun.

This is clearly illustrated in Figure 1 wherein is shown a portable welding gun 10 having a relatively fixed electrode 11 and a movable electrode 12, the latter arranged to be moved by piston 13 housed within the cylinder 14, which cylinder is in turn attached to a hand grip 15.

Fluid control, for example by pneumatic pressure, is attained from the air line 16 and the control valve 17, which valve is operated from a lever 18 in the hand grip, the air communicating with the cylinder 14 by means of the passage 19 and the valve 17 being so arranged that upon release of air pressure in the gun, the cylinder exhausts through the port 20 to the atmosphere. To avoid building up of undesirable pressure on the opposite side of the piston, a small relief valve or port 21 is provided in the cylinder casing. Secured to the cylinder wall 14 is the selector switch 22 connected to a small port 23 by screw threaded engagement.

The normal operation of the apparatus occurs in the following manner:

The welding gun 10 is positioned with respect to the work so that complemental flange portions or other parts to be welded are positioned between the electrode or die members 11 and 12. The lever 18 is actuated and air pressure is applied, moving the piston from left to right thus creating a firm grip upon the work parts.

Upon cessation of movement of piston 13 and electrode 12 the pressure within the cylinder and switch begins to build up and at the point of predetermined pressure the switch 22 is actuated creating a continuous circuit from conductor 24 to conductor 25, and thence to the apparatus which controls or effects the energization of the primary circuit of a welding transformer. If it is desired to test the pneumatic operation of the gun without sending an impulse of welding energy to the electrodes, the selector control member 26 is operated so that the electrode can be moved relatively without effecting any circuit connection between conductors 24 and 25 as in Fig. 4.

If it should be desired to test the electrical application without applying pneumatic pressure, the circuit between conductors 24 and 25 may be accomplished by operation of element 26, as in Fig. 3.

The more detailed description of these features, as well as the special embodiment of the invention shown, follows: The switch, in what is believed to be one simple embodiment, is shown clearly in Figure 2 and comprises the following parts: An outer substantially cylindrical member 30, preferably being of insulating material, to which at one end is secured in screw-threaded engagement as at 31, a metallic member 32. This member is internally threaded for engagement with the tubular wall 30 and externally threaded at 23 for engagement with a welding gun or other apparatus to which it may be attached. Passing centrally from this member to the small passageway 33 which transmits the air or other fluid pressure from the interior of the cylinder 27 to the interior 34 of the switch and substantially centrally of the tubular outer wall 30 is a concentric insulating member 35 which serves both as a bearing for the fluid actuated switch element and as a supporting and retaining structure for the electric contacts which provide interiorly of the switch continuations of the conductors 24 and 25.

The far end of the tubular member 30 is closed by a metal cap 36 which is firmly secured to the tube 30 by screws 37, or, by way of variation, it may be in screw threaded engagement therewith if this latter method of securement should be desirable.

The electrical conductors 24 and 25 extend internally of the switch housing and are secured therein by suitable screws 38 and 39 respectively. The circuit path is continued by means of two flexible conducting strips 40 and 41. These metal members extend internally of the cylinder and are secured therein by proper grooves 42 and 43 which grooves are preferably diametrically opposite each other on the member 35. To effect a current passage through the leads 24 and 25, a conducting path between these two conductors is made through intermediation of a conducting tip 44 carried by a piston rod 45 which in turn is secured to a piston 46 by a suitable machine screw 47. The piston 46 may preferably comprise a metal washer 48, a gasket or packing member 49 and an additional metal washer 50 or enlarged portion on the piston. The piston is retained in its inactive position, namely in the position shown on Figure 3, by means of a helical spring 51. Upon admission of pressure through passageway 33, the piston 46 is forced to the right against spring 51 to the position shown in Figure 2 wherein an electric circuit is completed from conductor 24 to connection 38, contact 40, contact tip 44, contact 41, connection 39 to conductor 25. Upon release of pressure, the spring again forces piston to left and breaks the circuit.

At the opposite end of the switch is a selector control 26, of insulating material comprising a disc-like central portion 53, an elongated operating portion 52 and an elongated portion 54 at the opposite side of the central portion from the first named operating portion and a conducting ring 55. This member is retained in the position of Figure 2 by means of a spring 56. The selector element is constructed in such a manner that a 90 degree partial rotation thereof is obtainable. This is accomplished by the irregularly slotted portion 57 in the cap 36.

When it is desired to operate the apparatus, the arrangement of the parts is similar to that of Figure 2 allowing the piston to move to right and at its right hand limit of motion close the circuit.

If it should be desirable to operate the electrode without energizing the welding circuit, the control handle 52 of the selector element 26 is turned 90 degrees from the position shown in Figure 2 to the position shown in Figures 3 and 4. Under these circumstances portion 54 separates the contacts 40 and 41 due to its turning from the full line position of Figure 7 to the dotted position. The piston may move to the right, but the conducting cap 44 does not engage the contacts 40 and 41.

After the equipment has been tested, the weld can be made in either of the following ways:

(1) By turning the selector control back to its original position as in Figures 2 and 6 allowing the contacts to engage conducting cap, or
(2) while retaining the selector element in the position of Figures 3 and 4, it may be pushed inwardly against the opposition of spring 56 and close circuit as seen in Figure 3 from the contact 40 to the conducting ring 55 and thence to the contact 41. In this manner, I have accomplished great selectivity of control, easy testing of the equipment as to any of its functional characteristics independently as well as collectively.

While by way of illustration and example I have described my invention in connection with a preferred embodiment thereof as to structure, and the preferred manner of practicing it, it will be obvious to those skilled in the art, after understanding the foregoing specification, that various changes and modifications may be made without departing from the spirit or scope of the invention and I aim in the appended claims to cover all such modifications and changes.

What I claim is:

1. A selector switch comprising a plurality of contacts providing an open circuit arrangement, a contact arranged to bridge said first named contacts, fluid pressure means arranged to effect the bridging engagement of said contact, selector control means arranged to render said pressure operated contact means ineffective and contact means controlled by said selector means operable, while said selector means is operative to maintain the pressure operated contact means ineffective, to effect closing and opening of a conducting circuit path between said first named contact independently of said pressure operated contact.

2. A selector switch comprising a housing, two contacts within said housing, means providing a conducting circuit path between said contacts and the exterior of said housing, a pressure operated piston within said housing, a contact carried by said piston and arranged upon actuation of said piston to bridge said first named contacts, means arranged to yieldingly maintain said piston carried contact out of engagement with said first named contacts, a selector element in said housing, a bridging contact carried by said selector element, yieldable means maintaining said bridging contact out of engagement with said first named contacts, said selector element carrying a projection arranged to lie between said first named contacts and maintain said first named contacts out of contacting engagement with each other.

3. A selector switch comprising a housing, two contacts within said housing, means providing a conducting circuit path between said contacts and the exterior of said housing, a pressure operated piston within said housing, a contact carried by said piston and arranged upon actuation of said piston to bridge said first named contacts, means arranged to yieldingly maintain said piston carried contact out of engagement with said first named contacts, a selector element in said housing, a bridging contact carried by said selector element, yieldable means maintaining said bridging contact out of engagement with said first named contacts, said selector element carrying a projection arranged to lie between said first named contacts and maintain said first named contacts out of contacting engagement with each other, said selector element arranged upon selective actuation to render said pressure operated contacts ineffective.

4. A selector switch comprising a housing, two contacts within said housing, means providing a conducting circuit path between said contacts and the exterior of said housing, a pressure operated piston within said housing, a contact carried by said piston and arranged upon actuation of said piston to bridge said first named contacts, means arranged to yieldingly maintain said piston carried contact out of engagement with said first named contacts, a selector element in said housing, a bridging contact carried by said selector element, yieldable means maintaining said bridging contact out of engagement with said first named contacts, said selector element carrying a projection arranged to lie between said first named contacts and maintain said first named contacts out of contacting engagement with each other, all of the elements of said selector switch being concentric with the axis of the housing.

5. A selector switch comprising a housing, two contacts within said housing, means providing a conducting circuit path between said contacts and the exterior of said housing, a pressure operated piston within said housing, a contact carried by said piston and arranged upon actuation of said piston to bridge said first named contacts, means arranged to yieldingly maintain said piston carried contact out of engagement with said first named contacts, a selector element in said housing, a bridging contact carried by said selector element, yieldable means maintaining said bridging contact out of engagement with said first named contacts, said selector element carrying a projection arranged to lie between said first named contacts and maintain said first named contacts out of contacting engagement with each other, said pressure contact and selector element contact arranged to effect circuit closure of the first named contact due to motion in opposite directions.

EARL J. W. RAGSDALE.